US007241421B2

(12) United States Patent
Webster et al.

(10) Patent No.: US 7,241,421 B2
(45) **Date of Patent: *Jul. 10, 2007**

(54) MINIATURIZED FLUID DELIVERY AND ANALYSIS SYSTEM

(75) Inventors: James Russell Webster, Hsinchu (TW); Ping Chang, Hsinchu (TW); Shaw-Tzuv Wang, Hsinchu (TW); Chi-Chen Chen, Hsinchu (TW); Rong-I Hong, Hsinchu (TW)

(73) Assignee: AST Management Inc., Apia (WS)

( * ) Notice: Subject to any disclaimer, the term of this patent is extended or adjusted under 35 U.S.C. 154(b) by 650 days.

This patent is subject to a terminal disclaimer.

(21) Appl. No.: 10/437,046

(22) Filed: May 14, 2003

(65) Prior Publication Data

US 2004/0063217 A1 Apr. 1, 2004

(30) Foreign Application Priority Data

Sep. 27, 2002 (TW) .............................. 91122431 A

(51) Int. Cl.
*G01N 1/10* (2006.01)

(52) U.S. Cl. ........................ 422/100; 422/81; 436/180; 436/518; 436/524; 435/287.2; 435/287.3

(58) Field of Classification Search .................. 422/81, 422/100, 103; 436/46, 180, 518, 524; 435/6, 435/7.1, 287.1, 287.2, 287.3, 288.4, 288.5
See application file for complete search history.

(56) References Cited

U.S. PATENT DOCUMENTS

| | | | |
|---|---|---|---|
| 4,203,848 | A | 5/1980 | Grandine, II |
| 4,908,112 | A | 3/1990 | Pace |
| 4,920,056 | A | 4/1990 | Dasgupta |
| 5,585,069 | A | 12/1996 | Zanzucchi et al. |
| 5,632,876 | A | 5/1997 | Zanzucchi et al. |
| 5,644,177 | A | 7/1997 | Guckel et al. |
| 5,660,728 | A | 8/1997 | Saaski et al. |
| 5,681,484 | A | 10/1997 | Zanzucchi et al. |
| 5,819,749 | A | 10/1998 | Lee et al. |
| 5,839,467 | A | 11/1998 | Saaski et al. |
| 5,842,787 | A | 12/1998 | Kopf-Sill et al. |
| 5,856,174 | A | 1/1999 | Lipshutz et al. |
| 5,858,195 | A | 1/1999 | Ramsey |
| 5,858,804 | A | 1/1999 | Zanzucchi et al. |
| 5,869,004 | A | 2/1999 | Parce et al. |
| 5,876,675 | A | 3/1999 | Kennedy |
| 5,882,465 | A | 3/1999 | McReynolds |
| 5,901,939 | A | 5/1999 | Cabuz et al. |

(Continued)

FOREIGN PATENT DOCUMENTS

| | | | |
|---|---|---|---|
| WO | WO 01/62887 | A1 | 8/2001 |
| WO | WO 01/63241 | A1 | 8/2001 |

*Primary Examiner*—Maureen M. Wallenhorst
(74) *Attorney, Agent, or Firm*—Jone Day; Brett Lovejoy

(57) ABSTRACT

The present invention provides a method for combining a fluid delivery system with an analysis system for performing immunological, chemical, or biological assays. The method provides a miniature plastic fluidic cartridge containing a reaction chamber with a plurality of immobilized species, a capillary channel, and a pump structure along with an external linear actuator corresponding to the pump structure to provide force for the fluid delivery. The plastic fluidic cartridge can be configured in a variety of ways to affect the performance and complexity of the assay performed.

27 Claims, 3 Drawing Sheets

U.S. PATENT DOCUMENTS

| | | | |
|---|---|---|---|
| 5,922,591 | A | 7/1999 | Anderson et al. |
| 5,939,291 | A | 8/1999 | Loewy et al. |
| 5,957,579 | A | 9/1999 | Kopf-Sill et al. |
| 5,958,694 | A | 9/1999 | Nikiforov |
| 5,958,804 | A | 9/1999 | Brown, Jr. et al. |
| RE36,350 | E | 10/1999 | Swedberg et al. |
| 5,976,336 | A | 11/1999 | Dubrow et al. |
| 5,989,402 | A | 11/1999 | Chow et al. |
| 5,992,769 | A | 11/1999 | Wise et al. |
| 6,001,231 | A | 12/1999 | Kopf-Sill |
| 6,007,690 | A | 12/1999 | Nelson et al. |
| 6,032,923 | A | 3/2000 | Biegelsen et al. |
| 6,033,544 | A | 3/2000 | Demers et al. |
| 6,042,709 | A | 3/2000 | Parce et al. |
| 6,043,080 | A | 3/2000 | Lipshutz et al. |
| 6,048,498 | A | 4/2000 | Kennedy |
| 6,063,589 | A | 5/2000 | Kellogg et al. |
| 6,068,751 | A | 5/2000 | Neukermans |
| 6,068,752 | A | 5/2000 | Dubrow et al. |
| 6,073,482 | A | 6/2000 | Moles |
| 6,074,725 | A | 6/2000 | Kennedy |
| 6,074,827 | A | 6/2000 | Nelson et al. |
| 6,086,740 | A | 7/2000 | Kennedy |
| 6,086,825 | A | 7/2000 | Sundberg et al. |
| 6,089,534 | A | 7/2000 | Biegelsen et al. |
| 6,090,251 | A | 7/2000 | Sundberg et al. |
| 6,100,541 | A | 8/2000 | Nagle et al. |
| 6,102,068 | A | 8/2000 | Higdon et al. |
| 6,107,044 | A | 8/2000 | Nikiforov |
| 6,120,665 | A | 9/2000 | Chiang et al. |
| 6,123,316 | A | 9/2000 | Biegelsen et al. |
| 6,132,685 | A | 10/2000 | Kercso et al. |
| 6,149,870 | A | 11/2000 | Parce et al. |
| 6,153,073 | A | 11/2000 | Dubrow et al. |
| 6,158,712 | A | 12/2000 | Craig |
| 6,167,910 | B1 | 1/2001 | Chow |
| 6,168,948 | B1 | 1/2001 | Anderson et al. |
| 6,176,962 | B1 | 1/2001 | Soane et al. |
| 6,186,660 | B1 | 2/2001 | Kopf-Sill et al. |
| 6,193,471 | B1 | 2/2001 | Paul |
| 6,197,595 | B1 | 3/2001 | Anderson et al. |
| 6,203,759 | B1 | 3/2001 | Pelc et al. |
| 6,213,789 | B1 | 4/2001 | Chua et al. |
| 6,224,728 | B1 | 5/2001 | Oborny et al. |
| 6,236,491 | B1 | 5/2001 | Goodwin-Johansson |
| 6,240,944 | B1 | 6/2001 | Ohnstein et al. |
| 6,242,209 | B1 | 6/2001 | Ransom et al. |
| 6,255,758 | B1 | 7/2001 | Cabuz et al. |
| 6,288,472 | B1 | 9/2001 | Cabuz et al. |
| 6,296,020 | B1 | 10/2001 | McNeely et al. |
| 6,296,452 | B1 | 10/2001 | Caren |
| 6,302,134 | B1 | 10/2001 | Kellogg et al. |
| 6,318,970 | B1 | 11/2001 | Backhouse |
| 6,322,980 | B1 | 11/2001 | Singh |
| 6,326,211 | B1 | 12/2001 | Anderson et al. |
| 6,344,326 | B1 | 2/2002 | Nelson et al. |
| 6,349,740 | B1 | 2/2002 | Cho et al. |
| 6,408,878 | B2 * | 6/2002 | Unger et al. ................ 137/597 |
| 6,521,188 | B1 * | 2/2003 | Webster ...................... 422/100 |
| 6,527,003 | B1 * | 3/2003 | Webster ................... 137/15.18 |
| 6,585,939 | B1 | 7/2003 | Dapprich |
| 6,607,907 | B2 | 8/2003 | McNeely et al. |
| 6,613,525 | B2 | 9/2003 | Nelson et al. |
| 6,613,580 | B1 | 9/2003 | Chow et al. |
| 6,613,581 | B1 | 9/2003 | Wada et al. |
| 6,616,823 | B2 | 9/2003 | Kopf-Sill |
| 6,767,194 | B2 | 7/2004 | Jeon et al. |
| 2002/0098097 | A1 | 7/2002 | Singh |
| 2005/0180891 | A1 | 8/2005 | Webster et al. |

* cited by examiner

MINIATURIZED FLUID DELIVERY AND ANALYSIS SYSTEM

BACKGROUND OF THE INVENTION

Field of the Invention

This invention relates to a system comprising a fluid delivery and analysis cartridge and an external linear actuator. More particularly, the invention relates a system for carrying out various processes, including screening, immunological diagnostics, DNA diagnostics, in a miniature fluid delivery and analysis cartridge.

Recently, highly parallel processes have been developed for the analysis of biological substances such as, for example, proteins and DNA. Large numbers of different binding moieties can be immobilized on solid surfaces and interactions between such moieties and other compounds can be measured in a highly parallel fashion. While the size of the solid surfaces have been remarkably reduced over recent years and the density of immobilized species has also dramatically increased, typically such assays require a number of liquid handling steps that can be difficult to automate without liquid handling robots or similar apparatuses.

A number of microfluidic platforms have recently been developed to solve such problems in liquid handling, reduce reagent consumptions, and to increase the speed of such processes. Examples of such platforms are described in U.S. Pat. Nos. 5,856,174 and 5,922,591. Such a device was later shown to perform nucleic acid extraction, amplification and hybridization on HIV viral samples as described by Anderson et al, “Microfluidic Biochemical Analysis System”, Proceeding of the 1997 International Conference on Solid-State Sensors and Actuators, Tranducers ’97, 1997, pp. 477-480. Through the use of pneumatically controlled valves, hydrophobic vents, and differential pressure sources, fluid reagents were manipulated in a miniature fluidic cartridge to perform nucleic acid analysis.

Another example of such a microfluidic platform is described in U.S. Pat. No. 6,063,589 where the use of centripetal force is used to pump liquid samples through a capillary network contained on compact-disc liquid fluidic cartridge. Passive burst valves are used to control fluid motion according to the disc spin speed. Such a platform has been used to perform biological assays as described by Kellog et al, “Centrifugal Microfluidics: Applications,” Micro Total Analysis System 2000, Proceedings of the uTas 2000 Symposium, 2000, pp. 239-242. The further use of passive surfaces in such miniature and microfluidic devices has been described in U.S. Pat. No. 6,296,020 for the control of fluid in micro-scale devices.

An alternative to pressure driven liquid handling devices is through the use of electric fields to control liquid and molecule motion. Much work in miniaturized fluid delivery and analysis has been done using these electro-kinetic methods for pumping reagents through a liquid medium and using electrophoretic methods for separating and perform specific assays in such systems. Devices using such methods have been described in U.S. Pat. No. 4,908,112 , U.S. Pat. No. 6,033,544, and U.S. Pat. No. 5,858,804.

Other miniaturized liquid handling devices have also been described using electrostatic valve arrays (U.S. Pat. No. 6,240,944), Ferrofluid micropumps (U.S. Pat No. 6,318, 970), and a Fluid Flow regulator (U.S. Pat No. 5,839,467).

The use of such miniaturized liquid handling devices has the potential to increase assay throughput, reduce reagent consumption, simplify diagnostic instrumentation, and reduce assay costs.

SUMMARY OF THE INVENTION

The system of the invention comprises a plastic fluidic device having at least one reaction chamber connected to pumping structures through capillary channels and external linear actuators. The device comprises two plastic substrates, a top substrate and a bottom substrate containing capillary channel(s), reaction chamber(s), and pump/valve chamber(s)—and a flexible intermediate interlayer between the top and bottom substrate which provides providing a sealing interface for the fluidic structures as well as valve and pump diaphragms. Passive check valve structures are formed in the three layer device by providing a means for a gas or liquid to flow from a channel in the lower substrate to a channel in the upper substrate by the bending of the interlayer diaphragm. Furthermore flow in the opposite direction is controlled by restricting the diaphragm bending motion with the lower substrate. Alternatively check valve structures can be constructed to allow flow from the top substrate to the bottom substrate by flipping the device structure. Pump structures are formed in the device by combining a pump chamber with two check valve structures operating in the same direction. A hole is also constructed in the lower substrate corresponding to the pump chamber. A linear actuator external to the plastic fluidic device—can then be placed in the hole to bend the pump interlayer diaphragm and therefore provide pumping action to fluids within the device. Such pumping structures are inherently unidirectional.

In one embodiment the above system can be used to perform immunoassays by pumping various reagents from an inlet reservoir, through a reaction chamber containing a plurality of immobilized antibodies or antigens, and finally to an outlet port. In another embodiment the system can be used to perform assays for DNA analysis such as hybridization to DNA probes immobilized in the reaction chamber. In still another embodiment the device can be used to synthesize a series of oligonucleotides within the reaction chamber. While the system of the invention is well suited to perform solid-phase reactions within the reaction chamber and provide the means of distributing various reagents to and from the reaction chamber, it is not intended to be limited to performing solid-phase reactions only.

The system of the invention is also well suited for disposable diagnostic applications. The use of the system can reduce the consumables to only the plastic fluidic cartridge and eliminate any cross contamination issues of using fixed-tipped robotic pipettes common in high-throughput applications.

DETAILED DESCRIPTION OF THE INVENTION

Figure 1A:
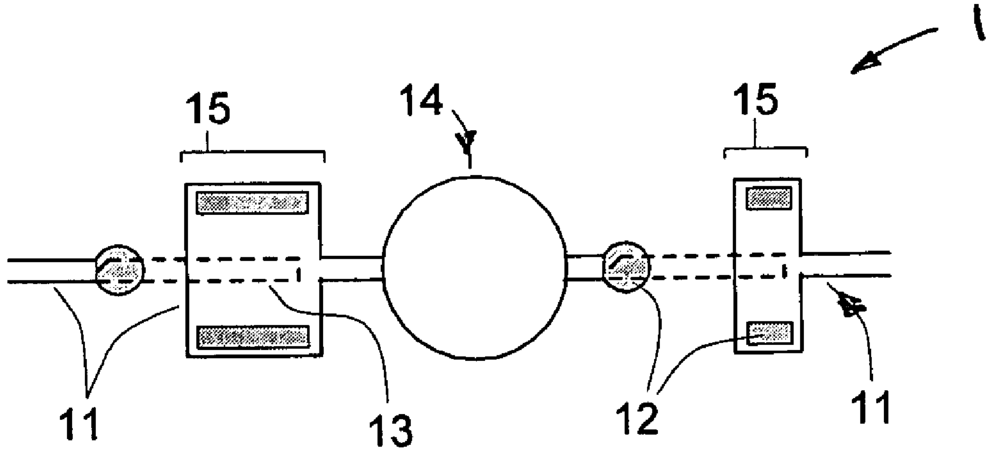
FIG. 1A is a top view of a pump structure within the plastic fluidic device of the invention.
Figure 1B:
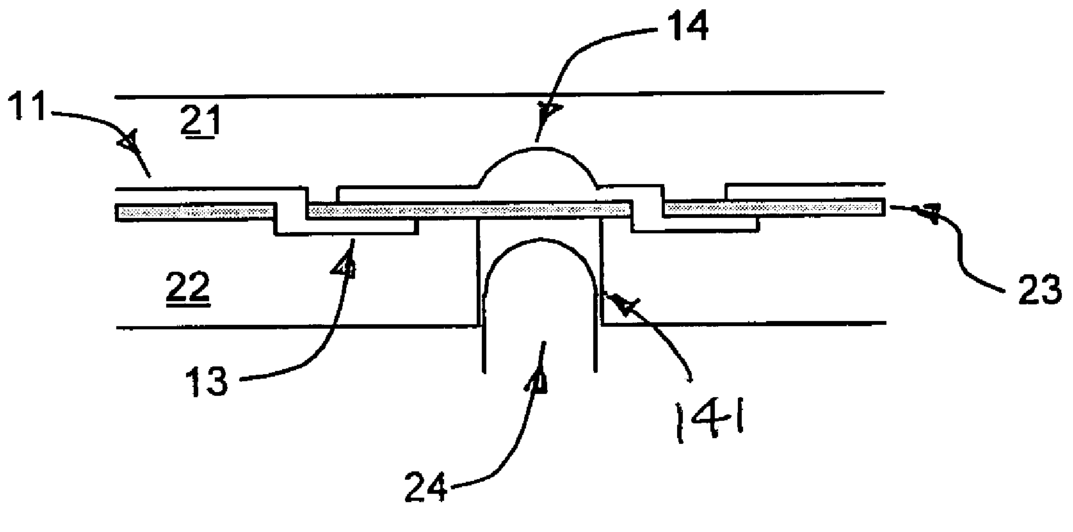
FIG. 1B is a cross section view of the pump structure within the plastic fluidic device of the invention.

The system of the invention comprises a plastic fluidic cartridge and a linear actuator system external to the fluidic cartridge. FIG. 1A shows a cross-sectional view of a pump structure 1 formed within the fluidic cartridge of the invention. The plastic fluidic cartridge comprises three primary layers: an upper substrate 21, a lower substrate 22, and a flexible intermediate interlayer 23, as shown in FIG. 1B. The three layers can be assembled by various plastic assembly methods such as, for example, screw assembly, heat staking, ultrasonic bonding, clamping, or suitable reactive/adhesive bonding methods. The upper and lower substrates 21, 22 both contain a variety of features that define channels of capillary dimensions as well as pump chambers, valve chambers, reaction chambers, reservoirs, and inlet/outlet ports within the cartridge. FIG. 1B shows a top view of the pump structure of FIG. 1A. The pump is defined by a pump chamber 14 and two passive check valves 15 that provide a high resistance to flow in one direction only. The passive check valves 15 comprise a lower substrate channel 13 and an uppersubstrate channel 11 separated by the interlayer 12 such that holes through the interlayer 12 are contained within the upper substrate channel 11 but not within the lower substrate channel 13. Such check valve structures provide a low resistance to a gas/liquid flowing from the lower substrate channel 13 to the upper substrate channel 11 and likewise provide a high resistance to a gas/liquid flowing from the upper substrate channel 11 to the lower substrate channel 13. The pump chamber 14 has an upper substrate chamber and a hole 141 in the lower substrate 22 to free the interlayer 23 to act as a diaphragm. A linear actuator 24 external to the fluidic cartridge, can then be placed in the hole 141 to bend the pump interlaye diaphragm 23 and therefore provide the necessary force to deform the diaphragm 23 to provide pumping action to fluids within the device.

Figure 2:
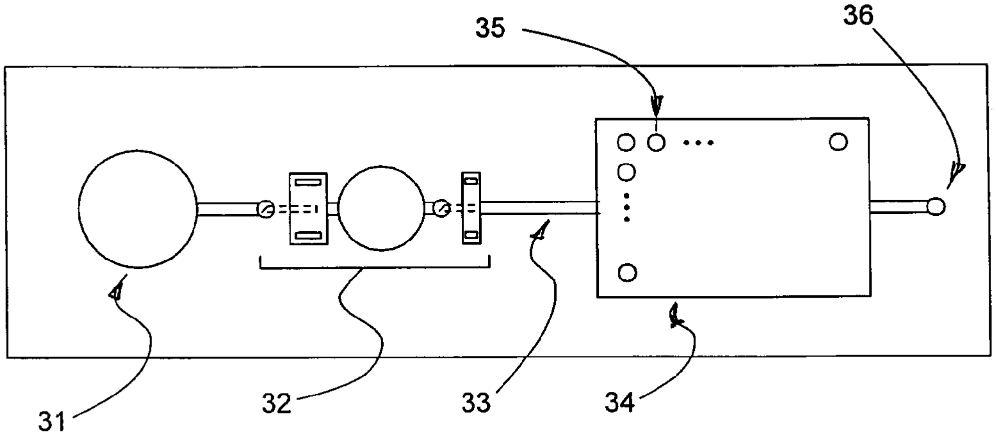
FIG. 2 is a top view of a plastic fluidic device of the invention configured as a single-fluid delivery and analysis device.

FIG. 2 shows a top view of a plastic fluidic cartridge of the invention configured as a single-fluid delivery and analysis device. Fluid is first placed into the reservoir 31 manually or automated using a pipette or similar apparatus. A pump structure 32 similar to that of FIG. 1B is contained within the device. By repeatedly actuating an external linear actuator, fluid in reservoir 31 is pumped through the pump structure 32, the capillary channel 33 and into the reaction chamber 34. Reaction chamber 34 contains a plurality of immobilized bio-molecules 35 for specific solid-phase reactions with said fluid. After a specified reaction time, the fluid is pumped through reaction chamber 34 and out the exit port 36.

The upper and lower substrates 21, 22 of the plastic fluidic cartridge of the invention can be constructed using a variety of plastic materials such as, for example, poly-methyl-methacrylate (PMMA), polystyrene (PS), polycarbonate (PC), Polypropylene (PP), polyvinylchloride (PVC). In the case of optical characterization of reaction results within the reaction chamber, the upper substrate 21 is preferably constructed out of a transparent plastic material. Capillaries, reaction chambers, and pump chambers can be formed in such substrates 21, 22 using methods such as injection molding, compression molding, hot embossing, or machining. Thicknesses of the upper and lower substrates 21, 22 are suitably in, but not limited to, the range of 1 millimeter to 3 millimeter in thickness. The flexible interlayer 23 can be formed by a variety of polymer and rubber materials such as latex, silicone elastomers, polyvinylchloride (PVC), or fluoroelastomers. Methods for forming the features in the interlayer 23 include die cutting, rotary die cutting, laser etching, cutting, rotary die cutting, laser etching, injection molding, and reaction injection molding.

The linear actuator 24 of the present invention is preferred to be, but not limited to, an electromagnetic solenoid. Other suitable linear actuators include a motor/cam/piston configuration, a piezoelectric linear actuator, or motor/linear gear configuration.

The invention will further be described in a series of examples that describe different configurations for performing different analyses using the plastic fluidic cartridge and external linear actuator of this invention.

EXAMPLE 1

Immunological Assay

The plastic fluidic cartridge as shown in FIG. 2 can be utilized to perform immunological assays within reaction chamber 34 by immobilizing a plurality of bio-molecules such as different antibodies 35. First, a sample containing an unknown concentration of a plurality of antigens or antibodies is placed within reservoir 31. The external linear actuator is then repeatedly actuated to pump the sample from reservoir 31 to reaction chamber 34. The sample is then allowed to react with the immobilized antibodies 35 for a set time. At the set reaction time, the sample is then excluded from reaction chamber 34 through exit port 36. Such wash steps can be repeated as necessary. A solution containing a specific secondary antibody conjugated with a detectable molecule such a peroxidase enzyme, alkaline phosphatase enzyme, or fluorescent tag is placed into reservoir 31. The antibody solution is them pumped into reaction chamber 34 by repeatedly actuating the linear actuator. After a predetermined reaction time, the solution is pumped out through exit port 36. Reaction chamber 34 is then washed in a similar manner as previously describe. In the case of an enzyme conjugate, a substrate solution is placed into reservoir 31 and pumped into reaction chamber 34. The substrate will then react with any enzyme captured by the previous reactions with the immobilized antibodies 35 providing a detectable signal. For improved assay performance reaction chamber 34 can be maintained at a constant 37C.

Figure 3:
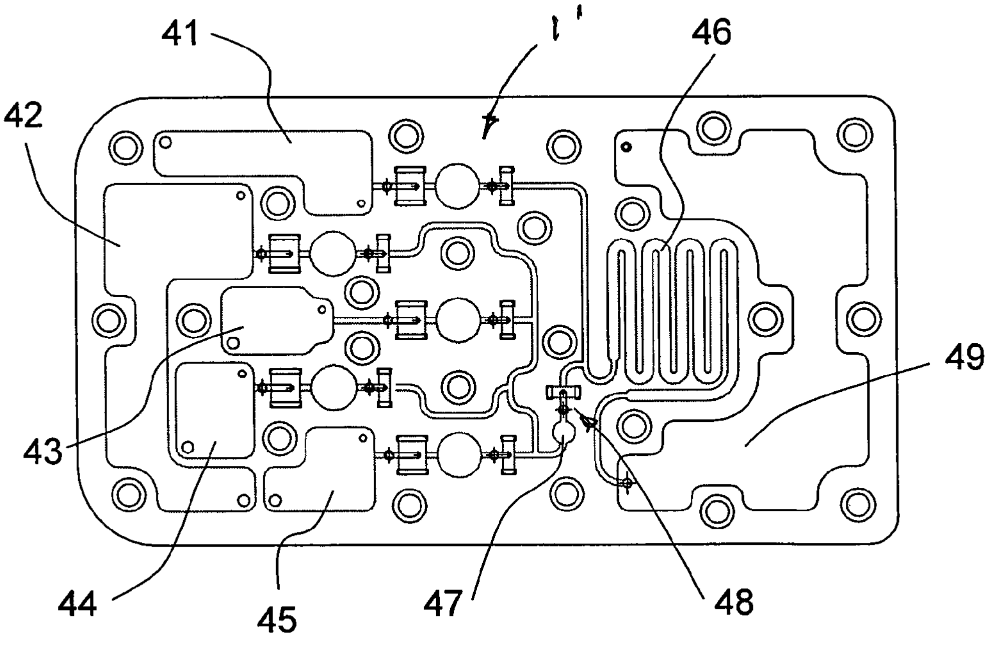
FIG. 3 is a top view of a plastic fluidic device of the invention configured as a 5-fluid delivery and analysis device.

According to the present invention, the plastic fluidic cartridge need not be configured as a single-fluid delivery and analysis device. FIG. 3 shows a plastic cartridge configured as a five fluid delivery and analysis device. Such a device can perform immunological assays, such as competitive immunoassay, immunosorbent immunoassay, immunometric immunoassay, sandwich immunoassay and indirect immunoassay, by providing immobilized antigens or antibodies in reaction chamber 46. Here the reaction chamber 46 is not configured as a wide rectangular area, but a serpentine channel of dimensions similar to capillary dimension. This configuration provides more uniform flow through the reaction chamber 46 at the expense of wasted space. To perform immunoassays, a sample containing unknown concentrations of a plurality of antigens or antibodies is placed in reservoir 41. A wash buffer is placed in reservoir 42. Reservoir 43 remains empty to provide air purging. A substrate solution specific to the secondary antibody conjugate is placed in reservoir 44. The secondary antibody conjugate is placed in reservoir 45. All reservoirs are connected to a pump structure 1' similar to that of FIG. 1 and provide pumping from the connected reservoir 41, 42, 43, 44, 45 through the reaction chamber 46 to the waste reservoir 49. A secondary reaction chamber 47 is provided for negative control and is isolated from the sample of reservoir 41 by check valve 48. The protocol for performing immunoassays in this device is equivalent to that described previously for the single-fluid configuration with the distinct difference that each separated reagent is contained in a separate reservoir and pumped with a separate pump structure using a separate external linear actuator. First, the external linear actuator corresponding to the pump connected to reservoir 41 is repeatedly actuated until the sample fills reaction chamber 46. After a predetermined reaction time, the sample is pumped to waste reservoir 49 using either the pump connected to the sample reservoir 41 or the pump connected to the air purge reservoir 42. The wash cycle and air purge can be repeated as necessary. The secondary antibody is them pumped into reaction time the secondary antibody is excluded from reaction chamber 46 either by the pump connected to reservoir 45 or the pump connected to the air purge reservoir 43. Reaction chamber 46 is then washed as before. The substrate is pumped into reaction chamber 46 by repeatedly actuating the linear actuator corresponding to the pump connected from the reaction chamber and replaced with wash buffer from reservoir 42. Results of the immunoassay can then be confirmed by optical measurement through the upper substrate.

Figure 4:
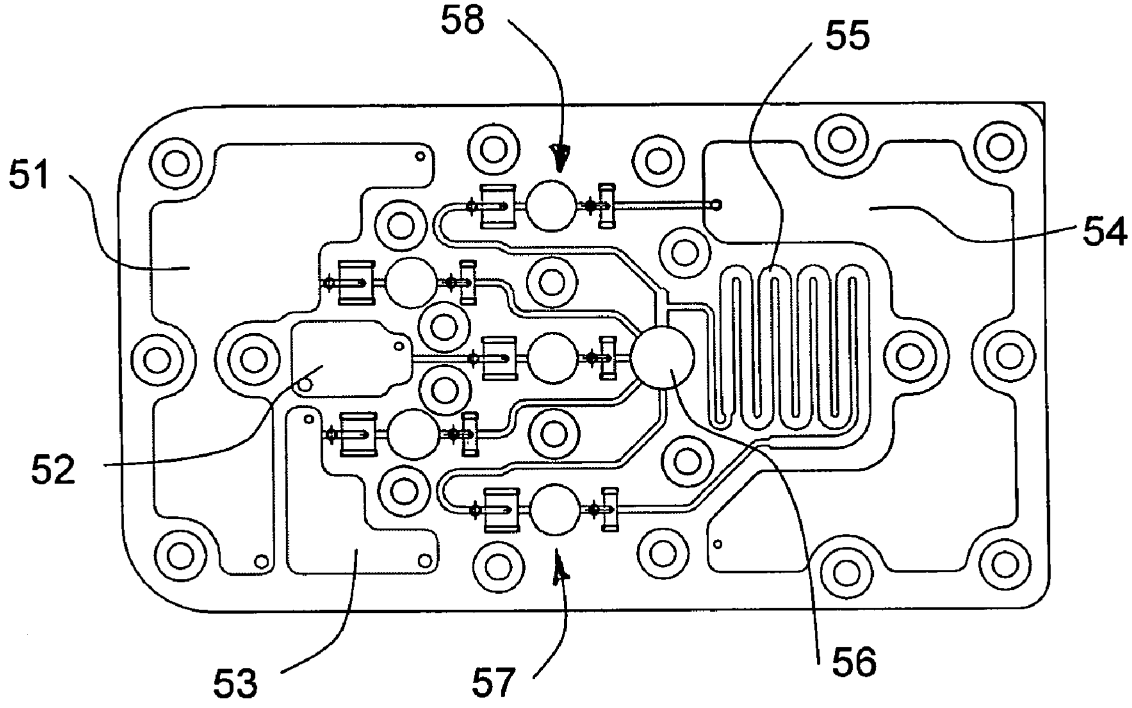
FIG. 4 is a top view of a plastic fluidic device of the invention configured as a recirculating 3-fluid delivery and analysis device.

Furthermore, the reactions performed with the plastic fluidic cartridge of the invention need not be limited to reactions performed in stationary liquids. FIG. 4 shows a plastic fluidic cartridge according to the invention configured to provide continuous fluid motion through the reaction chamber. In this configuration reservoir 51, 52, and 53 are connected to separate pump structures similar to the five fluid configuration of FIG. 3, but in this case are connected to an intermediate circulation reservoir 56. The pump structure 57 is connected to circulation reservoir 56 to provide continuous circulation of fluid from the circulation reservoir 56. In this manner fluid can be circulated through the reaction chamber without stopping. Such a fluid motion can provide betting mixing, faster reactions times, and complete sample reaction with immobilized species in reaction chamber 55. Pump structure 58 is connected such that it provides pumping of fluids from circulation reservoir 56 to waste reservoir 54. Immunological assays similar to those described above can be performed in this device by immobilizing antibodies in reaction chamber 55, placing the sample containing unknown concentrations of antigens or antibodies in the circulation reservoir 56, placing a solution of secondary antibody conjugate in reservoir 52, placing a substrate solution in reservoir 53, and placing a wash buffer in reservoir 51. The remaining protocol is identical to the above method with the addition of transferring fluids to and from the circulation reservoir 56 and continuously circulating during all reaction times.

EXAMPLE 2

DNA Hybridization

The system of the present invention can also be used to perform DNA hybridization analysis. Using the plastic cartridge of FIG. 4, a plurality of DNA probes are immobilized in the reaction chamber 55. A sample containing one or more populations of fluorescently tagged, amplified DNA of unknown sequence is placed in reservoir 52. A first stringency wash buffer is placed in reservoir 51. A second stringency wash buffer is placed in reservoir 53. The reaction chamber 55 is maintained at a constant temperature of 52C. the sample is transferred to the circulation reservoir 56 by repeatedly actuating the linear actuator corresponding to the pump structure connected to reservoir 52. The sample is then circulated through reaction chamber 55 by repeatedly actuating the linear actuator corresponding to pump structure 57. The sample is circulated continuously for a predetermined hybridization time typically from 30 minutes to 2 hours. The sample is then excluded from the circulation reservoir 56 and reaction chamber 55 by actuating pump structures 57 and 58 in opposing fashion. The first stringency wash is then transferred to the pump structure connected to reservoir 51. The buffer is then circulated through reaction chamber 55 in the same manner described above. After a predetermined wash time the buffer is excluded from reaction chamber 55 and circulation reservoir 56 as described. After exclusion of the second wash buffer the DNA hybridization results can read by fluorescent imaging.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A fluid delivery and analysis system, comprising:

a fluidic cartridge including a first substrate, a second substrate and a flexible intermediate interlayer sealedly interfaced between said first substrate and said second substrate to form therein one or more channels of capillary dimensions within the first substrate and the second substrate on both sides of flexible intermediate interlayer;

a fluid reservoir, a pump chamber, a reaction chamber, and a port formed at least partially in said first substrate or said second substrate of said fluidic cartridge, and wherein the one or more channels connect the fluid reservoir to the pump chamber, the pump chamber to the reaction chamber, and the reaction chamber to the port;

a fluid flow controlling structure, formed in said fluidic cartridge, restricting a flow of a fluid in only a direction from said fluid reservoir to said reaction chamber via said one or more channels and said pump chamber; and a linear actuator providing a pumping action in said pump chamber to push said fluid to flow from said fluid reservoir to said reaction chamber via said pump chamber and said one ore more channels.

2. The fluid delivery and analysis system, as recited in claim 1, wherein said pump chamber has a substrate chamber formed in said first substrate and a hole formed in said second substrate to free said flexible intermediate interlayer to act as a pump interlayer diaphragm, wherein said linear actuator moves in said hole to bend said pump interlayer diaphragm and therefore provides a necessary force to deform said pump interlayer diaphragm to provide said pumping action in said pump chamber to pump said fluid from said fluid reservoir to flow through said reaction chamber via said pump chamber and said one or more channels.

3. The fluid delivery and analysis system, as recited in claim 2, wherein said fluid flow controlling structure comprises a first passive check valve and a second passive check valve in said fluidic cartridge to restrict said fluid to flow from one of said one or more channels in said second substrate to another one of said one or more channels in said first substrate by bending of said pump interlayer diaphragm so as to control said fluid flowing from said fluid reservoir to said port, wherein any flow of said fluid from said port back to said fluid reservoir is controlled by restricting said bending of said pump interlayer diaphragm with said second substrate.

4. The fluid delivery and analysis system, as recited in claim 3, wherein each of said first and second passive check valves comprise a first substrate channel and a second substrate channel separated by said flexible intermediate interlayer wherein through holes formed in said flexible intermediate interlayer are contained within said first substrate channel but not within said second substrate channel.

5. The fluid delivery and analysis system, as recited in claim 1, wherein said fluid flow controlling structure comprises a first passive check valve positioned before said pump chamber and a second passive check valve positioned after said pump chamber in said fluidic cartridge to provide a lower resistance to said fluid to flow from said fluid reservoir to said reaction chamber via said pump chamber and said one or more channels and a higher resistance to said fluid to flow from said reaction chamber to said fluid reservoir via said pump chamber.

6. The fluid delivery and analysis system, as recited in claim 5, wherein each of said first and second passive check valves comprise a first substrate channel and a second substrate channel separated by said flexible intermediate interlayer wherein through holes formed in said flexible intermediate interlayer are contained within said first substrate channel but not within said second substrate channel.

7. The fluid delivery and analysis system, as recited in one of claims 1-3, wherein said reaction chamber contains a plurality of immobilized biomolecules for specific solid-phase reactions with said fluid, wherein after a predetermined period of reaction time, said fluid is pumped through said reaction chamber and out through said port.

8. The fluid delivery and analysis system, as recited in claim 7, wherein said plurality of immobilized bio-molecules is selected from the group consisting of immobilized antibodies and immobilized antigens.

9. The fluid delivery and analysis system, as recited in one of claims 1-3, wherein said first substrate and said second substrate of said fluidic cartridge are constructed from a plastic material selected from the group consisting of polymethyl- methacrytate plastic, polystyrene plastic, polycarbonate plastic, polypropylene plastic, polyvinylchloride plastic, and ABS plastic.

10. The fluid delivery and analysis system, as recited in one of claims 1-3, wherein said first substrate is made of transparent plastic material and wherein said channels, said reaction chamber and said pump chamber are made by a method selected from the group consisting of injection molding, compression molding, hot embossing, and machining.

11. The fluid delivery and analysis system, as recited in claim 10, wherein each of said first and second substrates has a thickness of 1 mm to 3 mm.

12. The fluid delivery and analysis system, as recited in claim 10, wherein said flexible intermediate interlayer is made from a material selected from the group consisting of polymer, latex, silicone elastomer, polyvinylchloride, and fluoroelastomer.

13. The fluid delivery and analysis system, as recited in one of claims 1-3, wherein said flexible intermediate interlayer is made by a method selected from the group consisting of die cutting, rotary die cutting, laser etching, injection molding, and reaction injection molding.

14. The fluid delivery and analysis system, as recited in one of claims 1-3, wherein said linear actuator comprises a linear action source selected from the group consisting of electromagnetic solenoid, motor/cam/piston configuration, piezoelectric linear actuator, and motor/linear gear configuration.

15. A fluidic device for a fluid delivery and analysis system, comprising:

a first substrate, a second substrate and a flexible intermediate interlayer sealedly interfaced between said first substrate and said second substrate to form therein one or more channels of capillary dimensions, a pump chamber, an open reservoir and at least a reaction chamber, wherein said pump chamber, said open reservoir and said reaction chamber are connected to said one or more channels; and means for restricting a fluid being pumped.

16. The fluidic device, as recited in claim 15, wherein said pump chamber has a substrate chamber formed in said first substrate and a hole formed in said second substrate to free said flexible intermediate interlayer to act as a pump interlayer diaphragm, whereby a linear actuator of the fluid delivery and analysis system is capable of moving in said hole to bend said pump interlayer diaphragm and therefore provide a necessary force to deform said pump interlayer diaphragm to provide a pumping action in said pump chamber to pump said fluid flow through said reaction chamber via said one or more channels.

17. The fluidic device, as recited in claim 16, wherein said means for restricting a fluid comprises a first passive check valve positioned before said pump chamber and a second passive check valve positioned after said pump chamber in said fluidic device to provide a lower resistance to said fluid to flow through said reaction chamber in one direction and a higher resistance to said fluid to flow through said reaction chamber in an opposing direction.

18. The fluidic device, as recited in claim 17, wherein said first passive check valve and said second passive check valve each comprise a first substrate channel and a second substrate channel separated by said flexible intermediate interlayer wherein through holes formed in said flexible intermediate interlayer are contained within said first substrate channel but not within said second substrate channel.

19. The fluidic device, as recited in claim 16, wherein said means for restricting a fluid comprises two passive check valves in said fluidic device to restrict said fluid to flow from one of said one or more channels in said second substrate to another one of said one or more channels in said first substrate by bending of said pump interlayer diaphragm, wherein any flow of said fluid in an opposite direction is controlled by restricting said bending of said pump interlayer diaphragm with said second substrate.

20. The fluidic device, as recited in claim 19, wherein each of said two passive check valves comprises a first substrate channel and a second substrate channel separated by said interlayer wherein through holes formed in said flexible intermediate interlayer are contained within said first substrate channel but not within said second substrate channel.

21. The fluidic device, as recited in one of claims 16-19, wherein said first substrate is made of transparent plastic material and wherein said one or more channels, said reaction chamber and said pump chamber are made by a method selected from the group consisting of injection molding, compression molding, hot embossing, and machining.

22. The fluidic device, as recited in claim 21, wherein each of said first and second substrates has a thickness of 1 mm to 3 mm.

23. The fluidic device, as recited in claim 21, wherein said intermediate interlayer is made from a material selected from the group consisting of polymer, latex, silicone elastomer, polyvinylchloride, and fluoroelastomer.

24. The fluidic device, as recited in one of claims 15-19, wherein said reaction chamber contains a plurality of immobilized bio-molecules for specific solid-phase reactions with said fluid, wherein after a predetermined period of reaction time, said fluid is pumped through said reaction chamber.

25. The fluidic device, as recited in claim 24, wherein said plurality of immobilized bio-molecules is selected from the group consisting of immobilized antibodies and immobilized antigens.

26. The fluidic device, as recited in one of claims 15-19, wherein said first and second substrates are constructed from a plastic material selected from the group consisting of poly-methyl-methacrylate plastic, polystyrene plastic, polycarbonate plastic, polypropylene plastic, polyvinylchloride plastic, and ABS plastic.

27. The fluidic device, as recited in one of claims 15-19, wherein said intermediate interlayer is made by a method selected from the group consisting of die cutting, rotary die cutting, laser etching, injection molding, and reaction injection molding.

* * * * *